(12) United States Patent
Tsuyuzaki et al.

(10) Patent No.: US 8,011,718 B2
(45) Date of Patent: Sep. 6, 2011

(54) REAR VEHICLE BODY STRUCTURE

(75) Inventors: Takumi Tsuyuzaki, Wako (JP); Toshizumi Yamaguchi, Wako (JP); Hiro Nushii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 12/357,608

(22) Filed: Jan. 22, 2009

(65) Prior Publication Data
US 2009/0184542 A1 Jul. 23, 2009

(30) Foreign Application Priority Data
Jan. 23, 2008 (JP) .................................. 2008-012472

(51) Int. Cl.
*B62D 25/08* (2006.01)
(52) U.S. Cl. .............................. 296/203.04; 296/193.08
(58) Field of Classification Search ............... 296/146.6, 296/187.11, 193.08, 203.01, 203.03, 203.04, 296/97.22
See application file for complete search history.

(56) References Cited

U.S. PATENT DOCUMENTS

| 1,868,263 | A | * | 7/1932 | Wemann | 296/203.01 |
| 4,875,733 | A | * | 10/1989 | Chado et al. | 296/203.04 |
| 4,973,103 | A | * | 11/1990 | Imajyo et al. | 296/203.04 |
| 5,137,325 | A | * | 8/1992 | Ohya | 296/187.12 |
| 5,209,541 | A | * | 5/1993 | Janotik | 296/29 |
| 5,228,741 | A | * | 7/1993 | Ide | 296/187.11 |
| 5,267,772 | A | * | 12/1993 | Ohta et al. | 296/187.11 |
| 5,271,687 | A | * | 12/1993 | Holka et al. | 403/233 |
| 6,003,898 | A | * | 12/1999 | Teply et al. | 280/785 |
| 6,073,993 | A | * | 6/2000 | Iwatsuki et al. | 296/203.04 |
| 6,663,166 | B2 | * | 12/2003 | Achleitner | 296/146.6 |
| 2002/0014787 | A1 | * | 2/2002 | Yamamoto | 296/188 |
| 2002/0185892 | A1 | * | 12/2002 | Rima et al. | 296/203.01 |

FOREIGN PATENT DOCUMENTS

| JP | 02249773 A | * | 10/1990 |
| JP | 04011581 A | * | 1/1992 |
| JP | 2004-322822 | | 11/2004 |
| JP | 2006-273134 | | 10/2006 |

* cited by examiner

*Primary Examiner* — Glenn Dayoan
*Assistant Examiner* — Paul Chenevert
(74) *Attorney, Agent, or Firm* — Rankin, Hill & Clark LLP

(57) ABSTRACT

A pair of rear floor frames extend in a fore-and-aft direction in a lower part of a vehicle body. A pair of rear horizontal frames extend in the fore-and-aft direction above corresponding rear wheels. A door beam extends in the fore-and-aft direction in each side door in alignment with the corresponding rear horizontal frame. A pair of rear vertical frames each extend vertically behind the corresponding rear wheel and join rear ends of the corresponding rear floor frame and rear horizontal frame to each other. In a rear end crash with a vehicle having a front bumper at a relatively high position, the rear vertical frames allow the impact energy of the rear end crash to be evenly distributed, and deformation of the passenger compartment is minimized. The rear horizontal frames allow the impact energy to be transmitted to the door beams, contributing to reinforcement of the passenger compartment.

12 Claims, 3 Drawing Sheets

REAR VEHICLE BODY STRUCTURE

The contents of the original Japanese patent application No. 2008-012472 that was filed on Jan. 23, 2008 on which the Paris Convention priority claim is made for the present application, are incorporated in this application by reference.

TECHNICAL FIELD

The present invention relates to a rear vehicle body structure, and in particular to a rear vehicle body structure suitable for a hatchback passenger vehicle that has no rear bulkhead for separating a rear luggage compartment from a passenger compartment.

BACKGROUND OF THE INVENTION

Japanese patent laid open publication (kokai) No. 2004-322822 discloses a rear vehicle body structure suitable for a hatchback passenger vehicle that has no rear bulkhead for separating a rear luggage compartment from a passenger compartment. Each rear floor frame of this rear vehicle body structure comprises a kickup portion that is bent upward from a rear end of the rear floor frame and extends horizontally and a reinforcement that extends horizontally below the kickup portion in a parallel relationship, and the rear ends of these frame members are connected to a rear pillar. A suspension support member extends in a fore-and-aft direction of the vehicle body between the rear pillar and a quarter pillar provided immediately behind the rear seat.

According to this arrangement, the rigidity of the rear part of the vehicle body is increased, and the vehicle body is made more resistant to a rear end collision. However, the distribution of the load of a rear end collision is not necessarily optimally distributed depending on the mode of the rear end collision, and there is no effective measure against a rear end crash by a taller vehicle.

Japanese patent laid open publication (kokai) No. 2006-273134 discloses a rear vehicle body structure in which an arcuate frame member joins each longitudinally extending rear floor side member with a rear cross member extending laterally across the vehicle body at a higher elevation than the rear floor side member.

This provides a measure against a rear end crash by a taller vehicle and promotes a favorable distribution of a load of a rear end crash, but these effects are not entirely satisfactory. Furthermore, this arrangement requires some space between the rear seat and rear cross member which a small hatchback passenger vehicle cannot afford.

BRIEF SUMMARY OF THE INVENTION

In view of such problems of the prior art, a primary object of the present invention is to provide a rear vehicle body structure which is resistant to a rear end crash by a taller vehicle.

A second object of the present invention is to provide a rear vehicle body structure which can favorably distribute a load of a rear end crash.

A third object of the present invention is to provide a rear vehicle body structure which can effectively control the deformation a passenger compartment at the time of a rear end crash.

A fourth object of the present invention is to provide such a rear vehicle body structure which is suitable for a small hatchback passenger vehicle.

According to the present invention, such an object can be accomplished at least partly by providing a rear vehicle body structure for a vehicle comprising a pair of rear floor frames extending in a fore-and-aft direction in a lower part of a vehicle body in a laterally spaced apart and mutually parallel relationship, and a pair of rear horizontal frames extending in the fore-and-aft direction at a prescribed height above corresponding rear wheels. The rear vehicle body structure further comprising a door beam extending in the fore-and-aft direction in each side door in alignment with the corresponding rear horizontal frame, and a pair of rear vertical frames each extending vertically behind the corresponding rear wheel and joining rear ends of the corresponding rear floor frame and rear horizontal frame to each other.

Owing to the provision of the rear vertical frames, even when a rear end crash is caused by a vehicle having a front bumper at a relatively high position, the vehicle body structure according to the present invention is able to evenly distribute the impact energy of the rear end crash, and the deformation of the passenger compartment can be minimized even when the present invention is applied to a small hatchback passenger vehicle lacking in a rear bulkhead for separating the passenger compartment from a luggage compartment. Also, the rear horizontal frames allow the impact energy of a rear end crash to be transmitted to the door beams, and this contributes to the reinforcement of the passenger compartment against deformation.

According to a preferred embodiment of the present invention, each rear vertical frame comprises a lower part that overlaps with the corresponding rear wheel, preferably a center of the rear wheel, as seen from front. Thereby, the impact load of a rear end crash that is applied to the rear vertical frames can be supported by the rear wheels, in particular the pneumatic tires thereof.

According to a particularly preferred embodiment of the present invention, the rear vehicle body structure further comprises a rear cross member extending laterally across the vehicle body and joining the two rear vertical frames to each other. Thereby, owing to the provision of the rear cross member, even in case of an offset rear end crash, the impact energy can be distributed evenly to the entire vehicle body structure. Preferably, the rear cross member is attached to vertically intermediate points of the rear vertical frames.

According to a certain aspect of the present invention, the vehicle body includes a fuel lid and a fuel pipe connected to the fuel lid, and the fuel pipe extends immediately inboard side of one of the rear horizontal frames. Thereby, the fuel pipe is favorably protected by the rear horizontal frame, and this provides a protection for the fuel pipe without adding any special reinforcement members.

According to a particularly preferred embodiment of the present invention, the vehicle body structure further comprises a pair of rear inner side panels each of which includes a front flange bent inboard and extending vertically along a front edge thereof, and a rear flange bent inboard and extending vertically, wherein each rear horizontal frame comprises a front part having a rear end connected to the front flange and a rear part having a front end connected to the front flange and a rear end connected to the rear flange. Additionally, the vehicle body structure may further comprise a pair of rear outer side panels each of which includes a front flange bent inboard and extending vertically so as to define a door jamb for the side door, wherein the front part of each horizontal frame has a front end connected to the front flange of the rear outer side panel.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
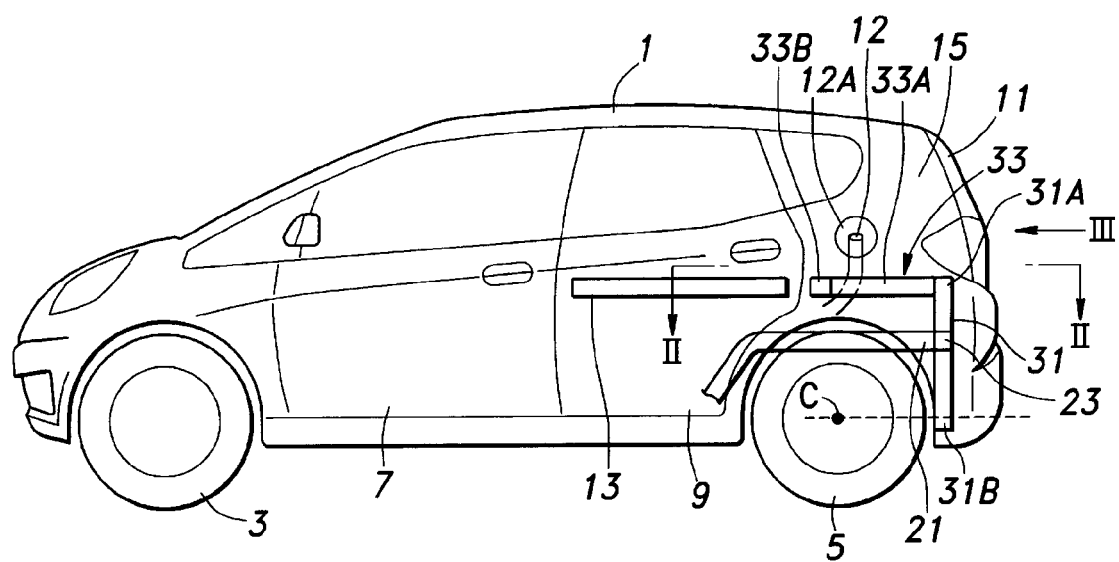
FIG. 1 is a see-through side view of a vehicle body embodying the present invention.
Figure 2:
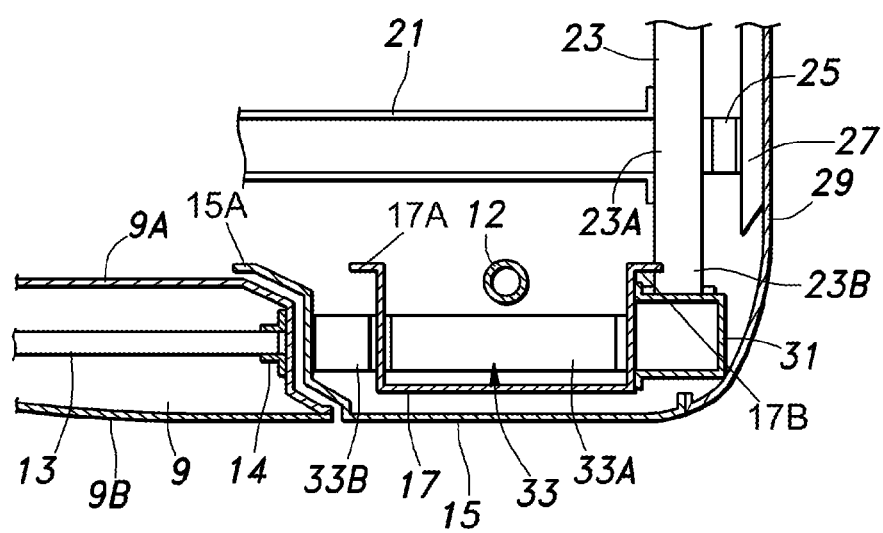
FIG. 2 is a sectional view taken along line II-II of FIG. 1.
Figure 3:
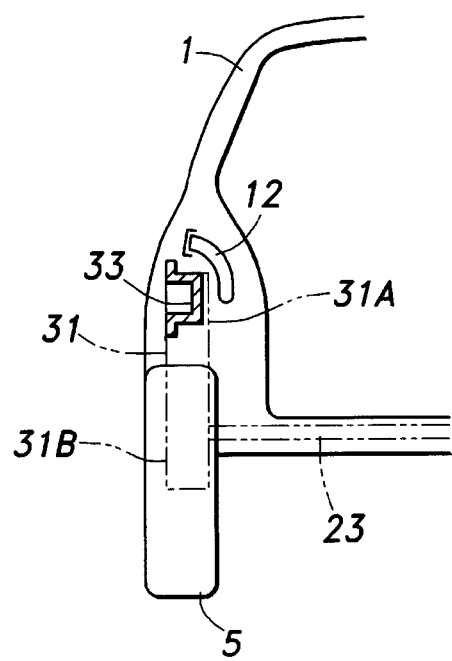
FIG. 3 is a fragmentary see-through view, partly in section as seen in the direction indicated by arrow III in FIG. 1.

FIG. 1 shows the overall structure of a hatchback passenger vehicle having a rear vehicle body structure embodying the present invention. This vehicle comprises a pair of front wheels 3, a pair of rear wheels 5 and a vehicle body 1 fitted with a pair of front side doors 7, a pair of rear side doors 9 and a tailgate 11.

Each rear side door 9 includes a door inner panel 9A, a door outer panel 9B and a door beam 13 extending horizontally in a fore-and-aft direction at a prescribed height within a cavity defined between the door inner panel 9A and door outer panel 9B for reinforcement. The front end of the door beam 13 is attached to a front part of the door inner panel 9A, and the rear end of the door beam 13 is attached to a rear part of the door inner panel 9A via a bracket 14 in each case.

The rear vehicle body comprises a pair of rear outer side panels 15, a pair of rear inner side panels 17, a pair of rear floor frames 21 extending in the fore-and-aft direction of the vehicle body 1 in a mutually parallel relationship and a rear cross member (spare tire pan cross member) 23 extending across the width of the vehicle body 1. Each rear floor frame 21 comprises a kickup portion that is bent upward at a point adjacent to the front end of the rear wheel 5 and extends horizontally from this point to the rear end thereof. The rear ends of the rear floor frames 21 are welded to the parts 23A of the rear cross member 23 adjacent to the lateral ends thereof by welding. To the rear side of the rear cross member 23 is attached a rear bumper beam 27 via a rear bumper beam extension 25 and is covered by a rear fascia cover 29.

A pair of rear vertical frames 31 are provided at corresponding rear corners of the vehicle body 1 as seen in plan view, and are each welded to the corresponding lateral end 23B of the rear cross member 23. Each rear vertical frame 31 comprises an upper part 31A extending above the rear side frame 21, and a lower part 31B depending from the rear side frame 21. The lower part 31B overlaps with the rear wheel 5, preferably a central part C thereof, in a front view.

Each rear inner side panel 17 is provided with a front flange 17A formed by inwardly bending a front end thereof and a rear flange 17B formed by inwardly bending a rear end thereof. These flanges 17A and 17B are thus bent in an inboard direction, and extend both vertically and laterally.

A rear horizontal frame 33 extends horizontally along each side of the vehicle body, and comprises a rear portion 33A that extends between the front flange 17A and rear flange 17B and a front portion 33B that extends in alignment with the rear portion 33A between the front flange 17A of the rear inner side panel 17 and a similar front flange 15A bent inwardly from the rear outer side panel 15 so as to define a door jamb for the rear side door 9. The two ends of both of the rear portion 33A and front portion 33B are welded to the corresponding flanges. The rear end of the rear portion 33A of the rear horizontal frame 33 is welded to the corresponding rear vertical frame 31 via the rear flange 17B of the rear inner side panel 17.

Furthermore, each rear horizontal frame 33 is in alignment with the door beam 13 of the corresponding rear side door 9.

A fuel pipe 12 extends from a fuel lid 12A of the vehicle body, and is passed immediately inboard of the corresponding rear horizontal frame 33.

The mode of operation of the illustrated embodiment is now described in the following. Because each rear vertical frame 31 extends vertically at the corresponding rear corner of the vehicle body, the rear vertical frame 31 is enabled to support the impact load of a rear end collision over an entire height of the rear vertical frame 31 which may correspond to a conceivable height of a front bumper of another vehicle that may crash onto the rear end of the subject vehicle.

Therefore, even when the vehicle is hit from behind by another vehicle having a front bumper at a relatively high position, the rear vertical frames 31 are able to support the impact of the rear end crash. This is particularly effective in improving the resistance to a rear end crash in a small hatchback passenger vehicle in which the distance between the rear seat and rear cross member 23 is relatively short.

Because each rear vertical frame 31 overlaps with the rear wheel 5 as seen from the front, the rear vertical frame 31 is supported and retained by the rear wheel 5, in particular the pneumatic tire thereof, as the rear vertical frame 31 deforms under the impact of a rear end crash, and this improves the resistance of the rear vehicle body against a rear end crash.

The impact load of a rear end crash is distributed to the rear floor frames 21 via the rear cross member 23, and also to the rear horizontal frames 33 and door beams 13. Thus, the door beams 13 also contribute to the favorable distribution of the impact load of a rear end crash. Owing to the contribution of the door beams 13 to the improvement of the resistance of the vehicle body 1 against a rear end crash, the resistance of the passenger compartment can be minimized while an increase in the weight of the vehicle body 1 can be avoided.

Because the two rear vertical frames 31 are connected to each other by the rear cross member 23, the impact load of an offset rear end crash can also be favorably distributed. This allows the thickness of the rear vehicle body to be generally reduced, and the weight of the vehicle body 1 can be reduced. Also, the presence of the rear cross member 23 simplifies the placement of the rear vertical frames 31 behind the corresponding rear wheels 5.

By placing the fuel pipe 12 on the inboard side of the rear horizontal frame 33, the rear horizontal frame 33 favorably protects the fuel pipe 12 from damages.

Although the present invention has been described in terms of a preferred embodiment thereof, it is obvious to a person skilled in the art that various alterations and modifications are possible without departing from the scope of the present invention which is set forth in the appended claims.

The invention claimed is:

1. A rear vehicle body structure for a vehicle, comprising:
   a pair of rear floor frames extending in a longitudinal direction in a lower part of a vehicle body in a laterally spaced apart and mutually parallel relationship;
   a pair of rear horizontal frames extending in the longitudinal direction at a prescribed height above corresponding rear wheels, the rear wheels defining a center about which the rear wheels rotate;
   a door beam extending in the longitudinal direction in each side door in alignment with the corresponding rear horizontal frame; and
   a pair of rear vertical frames each extending vertically behind the corresponding rear wheel such that the corresponding rear wheel center is longitudinally between the respective rear vertical frame and the corresponding door beam, the pair of rear vertical frames joining rear ends of the corresponding rear floor frame and rear horizontal frame to each other, the pair of rear vertical frames each including a lower part spaced from the rear horizontal frame a vertical distance that is greater than a vertical distance between the respective rear horizontal frame and the center of the corresponding rear wheel.

2. The rear vehicle body structure according to claim 1, further comprising a rear cross member extending laterally across the vehicle body and joining the two rear vertical frames to each other.

3. The rear vehicle body structure according to claim 2, wherein the rear cross member is attached to vertically intermediate points of the rear vertical frames.

4. A rear vehicle body structure for a vehicle, comprising:
a pair of rear floor frames extending in a fore-and-aft direction in a lower part of a vehicle body in a laterally spaced apart and mutually parallel relationship;
a pair of rear horizontal frames extending in the fore-and-aft direction at a prescribed height above corresponding rear wheels;
a fuel lid and a fuel pipe, the fuel pipe connected to the fuel lid, wherein the fuel pipe extends immediately inboard side of one of the rear horizontal frames;
a door beam extending in the fore-and-aft direction in each side door in alignment with the corresponding rear horizontal frame; and
a pair of rear vertical frames each extending vertically behind the corresponding rear wheel and joining rear ends of the corresponding rear floor frame and rear horizontal frame to each other.

5. A rear vehicle body structure for a vehicle, comprising:
a pair of rear floor frames extending in a fore-and-aft direction in a lower part of a vehicle body in a laterally spaced apart and mutually parallel relationship;
a pair of rear horizontal frames extending in the fore-and-aft direction at a prescribed height above corresponding rear wheels;
a pair of rear inner side panels each of which includes a front flange bent inboard and extending vertically along a front edge thereof, and a rear flange bent inboard and extending vertically, wherein each rear horizontal frame comprises a front part having a rear end connected to the front flange and a rear part having a front end connected to the front flange and a rear end connected to the rear flange;
a door beam extending in the fore-and-aft direction in each side door in alignment with the corresponding rear horizontal frame; and
a pair of rear vertical frames each extending vertically behind the corresponding rear wheel and joining rear ends of the corresponding rear floor frame and rear horizontal frame to each other.

6. The rear vehicle body structure according to claim 5, further comprising a pair of rear outer side panels each of which includes a front flange bent inboard and extending vertically so as to define a door jamb for the side door, wherein the front part of each horizontal frame has a front end connected to the front flange of the rear outer side panel.

7. A rear vehicle body structure for a vehicle, comprising:
a pair of rear floor frames extending in a fore-and-aft direction in a lower part of a vehicle body in a laterally spaced apart and mutually parallel relationship;
a pair of rear horizontal frames extending in the fore-and-aft direction at a prescribed height above corresponding rear wheels;
a door beam extending in the fore-and-aft direction in each side door in alignment with the corresponding rear horizontal frame;
a pair of rear vertical frames each extending vertically behind the corresponding rear wheel and joined to a rear end of the corresponding rear horizontal frame; and
a rear cross member extending laterally across the vehicle body and joining the pair of rear vertical frames to one another,
wherein each of the rear vertical frames comprises a lower part extending below the corresponding rear floor frame and overlapping with the corresponding rear wheel.

8. The rear vehicle body structure according to claim 7, wherein the lower part overlaps with a center of the rear wheel as seen from front.

9. The rear vehicle body structure according to claim 7, wherein the rear cross member is attached to vertically intermediate points of the rear vertical frames.

10. The rear vehicle body structure according to claim 7, further comprising a fuel lid and a fuel pipe, the fuel pipe connected to the fuel lid, wherein the fuel pipe extends immediately inboard side of one of the rear horizontal frames.

11. The rear vehicle body structure according to claim 7, further comprising a pair of rear inner side panels each of which includes a front flange bent inboard and extending vertically along a front edge thereof, and a rear flange bent inboard and extending vertically, wherein each rear horizontal frame comprises a front part having a rear end connected to the front flange and a rear part having a front end connected to the front flange and a rear end connected to the rear flange.

12. The rear vehicle body structure according to claim 11, further comprising a pair of rear outer side panels each of which includes a front flange bent inboard and extending vertically so as to define a door jamb for the side door, wherein the front part of each horizontal frame has a front end connected to the front flange of the rear outer side panel.

* * * * *